US012005701B2

(12) United States Patent
Smith et al.

(10) Patent No.: US 12,005,701 B2
(45) Date of Patent: Jun. 11, 2024

(54) PRINTING SYSTEM WITH DAMPERS TO VARY VACUUM SUCTION THROUGH A VACUUM PLENUM AND RELATED A DEVICES, SYSTEMS, AND METHODS

(71) Applicant: XEROX CORPORATION, Norwalk, CT (US)

(72) Inventors: Conner Nicholas Smith, Webster, NY (US); Jonathan Ross Ireland, Lancaster, PA (US); Bruce H. Smith, Webster, NY (US); Michael Nicholas Soures, Webster, NY (US); James D. van Bortel, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 102 days.

(21) Appl. No.: 17/222,169

(22) Filed: Apr. 5, 2021

(65) Prior Publication Data

US 2022/0314656 A1 Oct. 6, 2022

(51) Int. Cl.
*B41J 11/00* (2006.01)

(52) U.S. Cl.
CPC ................................ *B41J 11/0085* (2013.01)

(58) Field of Classification Search
CPC ........ B41J 11/0085; B41J 11/007; B41J 11/06
See application file for complete search history.

(56) References Cited

U.S. PATENT DOCUMENTS 8,388,246 B2 3/2013 Spence et al.
9,796,546 B1 * 10/2017 LeFevre ................. B65H 5/224
9,944,094 B1 4/2018 Herrmann et al.
10,358,307 B1 * 7/2019 Liu ................... G03G 15/6558
(Continued)

FOREIGN PATENT DOCUMENTS

EP 1 319 510 B1 9/2009
GB 2 374 834 A 10/2002

OTHER PUBLICATIONS

Arredondo, A, Mehtod for Detecting Presence of Sheet on Horizontal Flat Platen of Large Format Printer Involves Measureing Air Pressure in Position, and Determining Whether Print Media is Present If Measured Air Pressure is Below Predetermined Threshold, Apr. 6, 2017, All Pages (Year: 2017).*
(Continued)

*Primary Examiner* — Justin Seo
*Assistant Examiner* — Tracey M McMillion
(74) *Attorney, Agent, or Firm* — Jones Robb, PLLC

(57) ABSTRACT

A printing system comprises one or more printheads arranged to eject ink to a deposition region. Print media are held by vacuum suction against a movable support surface, which transports the print media though the deposition region. The vacuum suction is communicated from a vacuum source to the movable support surface via a vacuum plenum. An airflow control system comprises one or more dampers arranged in the vacuum plenum to control airflow between the vacuum source and the movable support surface. The dampers have an adjustable impedance to airflow through the damper. The airflow control system is configured to adjust the impedance of the damper based on a detected condition of the printing system. A detected condition of the printing system may include, for example, a sensed pressure in the vacuum plenum.

22 Claims, 10 Drawing Sheets

(56) References Cited

U.S. PATENT DOCUMENTS

| | | | | |
|---|---|---|---|---|
| 10,688,778 | B2 | 6/2020 | Fromm et al. | |
| 2010/0276879 | A1* | 11/2010 | Bober | B65H 5/224 271/276 |
| 2011/0292145 | A1* | 12/2011 | Hoover | B41J 11/0085 347/104 |
| 2014/0267524 | A1* | 9/2014 | Wanibuchi | B41J 11/06 347/104 |

OTHER PUBLICATIONS

E, Yuan-Bo, Impression Member Device And A Printing Device Having The Impression Member Device, Sep. 17, 2014, China, All pages (Year: 2014).*

Hiroshi, Wanibuchi, Impression Member Device And A Printing Device Having The Impression Member Device, Sep. 17, 2014, China, All Pages (Year: 2014).*

Miki Motoharu, Image Recording Device, Sep. 14, 2006, Japan, All Pages (Year: 2006).*

* cited by examiner

PRINTING SYSTEM WITH DAMPERS TO VARY VACUUM SUCTION THROUGH A VACUUM PLENUM AND RELATED A DEVICES, SYSTEMS, AND METHODS

FIELD

Aspects of this disclosure relate generally to inkjet printing, and more specifically to inkjet printing systems having a media transport device utilizing vacuum suction to hold and transport print media. Related devices, systems, and methods also are disclosed.

INTRODUCTION

In some applications, inkjet printing systems use an ink deposition assembly with one or more printheads, and a media transport device to move print media (e.g., a substrate such as sheets of paper, envelopes, or other substrate suitable for being printed with ink) through an ink deposition region of the ink deposition assembly (e.g., a region under the printheads). The inkjet printing system forms printed images on the print media by ejecting ink from the printheads onto the media as the media pass through the deposition region. In some inkjet printing systems, the media transport device utilizes vacuum suction to assist in holding the print media against a movable support surface (e.g., conveyor belt, rotating drum, etc.) of the transport device. Vacuum suction to hold the print media against the support surface can be achieved using a vacuum source (e.g., fans) and a vacuum plenum fluidically coupling the vacuum source to a side of the moving surface opposite from the side that supports the print media. The vacuum source creates a vacuum state in the vacuum plenum, causing vacuum suction through holes in the movable support surface that are fluidically coupled to the vacuum plenum. When a print medium is introduced onto the movable support surface, the vacuum suction generates suction forces that hold the print medium against the movable support surface. The media transport device utilizing vacuum suction may allow print media to be securely held in place without slippage while being transported through the ink deposition region under the ink deposition assembly, thereby helping to ensure correct locating of the print media relative to the printheads and thus more accurate printed images. The vacuum suction may also allow print media to be held flat as it passes through the ink deposition region, which may also help to increase accuracy of printed images, as well as helping to prevent part of the print medium from rising up and striking part of the ink deposition assembly and potentially causing a jam or damage.

One problem that may arise in inkjet printing systems that include a media transport device utilizing vacuum suction is unintended blurring of images resulting from air currents induced by the vacuum suction. In some systems, such blurring may occur in portions of the printed image that are near the edges of the print media. This blurring may occur due to uncovered holes in the media transport device adjacent to one or more of the edges of the print media. In particular, during a print job, the print media are spaced apart from one another on the movable support surface as they are transported through the deposition region of the ink deposition assembly, and therefore parts of the movable support surface between adjacent print media are not covered by any print media. This region between adjacent print media is referred to herein as the inter-media zone. Thus, adjacent to both the lead edge and the trail edge of each print medium in the inter-media zone there are uncovered holes in the movable support surface. Moreover, the holes for vacuum suction are generally arranged to extend across more-or-less the full width of the deposition region in the cross-process direction (i.e., the direction perpendicular to the direction of transport of the print media through the deposition region) so that the holes are able to hold down any size of print media that the system is designed to use, from the smallest to the largest sizes. However, if the print medium currently being printed is smaller than the largest size, it may not extend far enough in the cross-process direction to cover all the holes along an inboard edge or an outboard edge of the print medium (depending on which side the print medium is registered to). Thus, holes adjacent to an inboard or outboard edge of the print medium may also be uncovered. Because these holes near the lead, trail, inboard, and/or outboard edges are uncovered, the vacuum of the vacuum plenum induces air to flow through those uncovered holes. This airflow may deflect ink droplets as they are traveling from a printhead to the substrate, and thus cause blurring of the image near those edges.

A need exists to improve the accuracy of the placement of droplets in inkjet printing systems and to reduce the appearance of blur of the final printed media product. A need further exists to address the blurring issues in a reliable manner and while maintaining speeds of printing and transport to provide efficient inkjet printing systems.

SUMMARY

Embodiments of the present disclosure may solve one or more of the above-mentioned problems and/or may demonstrate one or more of the above-mentioned desirable features. Other features and/or advantages may become apparent from the description that follows.

In accordance with at least one embodiment of the present disclosure, a printing system comprises an ink deposition assembly, a media transport device, and an airflow control system. The ink deposition assembly comprises one or more printheads arranged to eject ink to a deposition region of the ink deposition assembly. The media transport device comprises a vacuum source, a vacuum plenum, and a movable support surface. The media transport device is configured to hold print media against the movable support surface by vacuum suction through holes in the movable support surface and transport the print media along a process direction though the deposition region. The vacuum suction is communicated from the vacuum source to the holes via the vacuum plenum. The airflow control system comprises one or more dampers arranged in the vacuum plenum. The damper(s) have an adjustable impedance to airflow through the damper(s) between the vacuum source and the holes. The airflow control system is configured to adjust the impedance of the damper(s) based on a detected condition of the printing system.

In accordance with at least one embodiment of the present disclosure, a method comprises transporting one or more print media through a deposition region of a printhead of a printing system, and ejecting print fluid from the printhead to deposit the ink to the print media in the deposition region. The print media are held during the transporting against a movable support surface of a media transport device via vacuum suction through holes in the media transport device, and the vacuum suction is communicated from a vacuum source to the holes via a vacuum plenum. The method further comprises controlling an airflow control system to dynamically adjust an impedance of a damper arranged in the vacuum plenum based on a detected condition of the printing system. The impedance of the damper controls airflow between the vacuum source and the holes.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more embodiments of the present teachings and together with the description explain certain principles and operation. In the drawings.

DETAILED DESCRIPTION

In the Figures and the description herein, numerical indexes such as "_1", "_2", etc. are appended to the end of the reference numbers of some components. When there are multiple similar components and it is desired to refer to a specific one of those components, the same base reference number is used and different indexes are appended to it to distinguish individual components. However, when the components are being referred to generally or collectively without a need to distinguish between specific ones, the index may be omitted from the base reference number. Thus, as one example, a print medium 5 may be labeled and referred to as a first print medium 5_1 when it is desired to identify a specific one of the print media 5, as in FIG. 1A, but it may also be labeled and referred to as simply a print medium 5 in other cases in which it is not desired to distinguish between multiple print media 5.

Figures 1A, 1B, 1C:
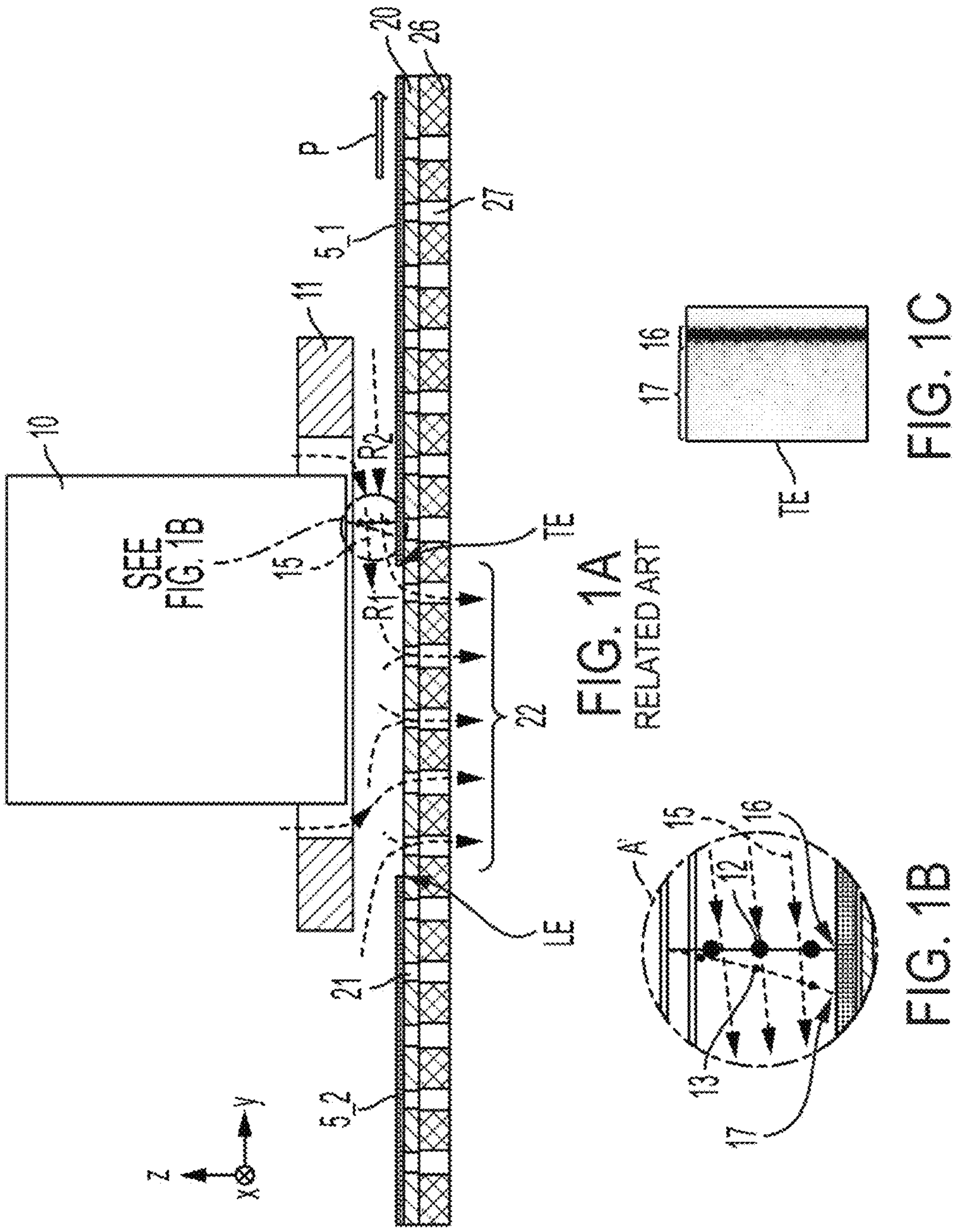
FIG. 1A RELATED ART
FIGS. 1A-1L schematically illustrate air flow patterns relative to a printhead assembly, transport device, and print media during differing stages of print media transport through an ink deposition region of a conventional inkjet printing system, and resulting blur effects in the printed media product.
Figures 1D, 1E, 1F:
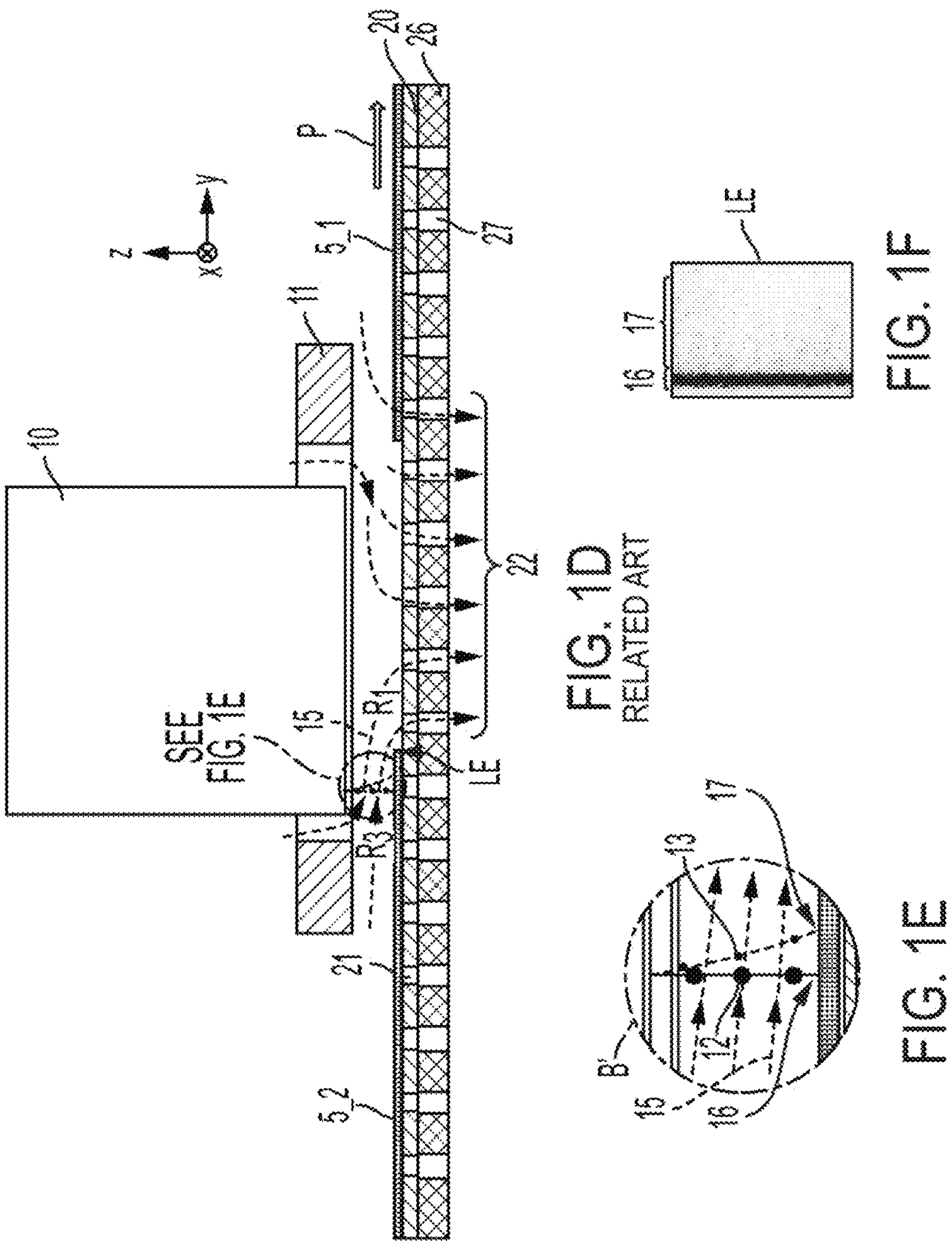
FIG. 1D RELATED ART
Figure 1G:
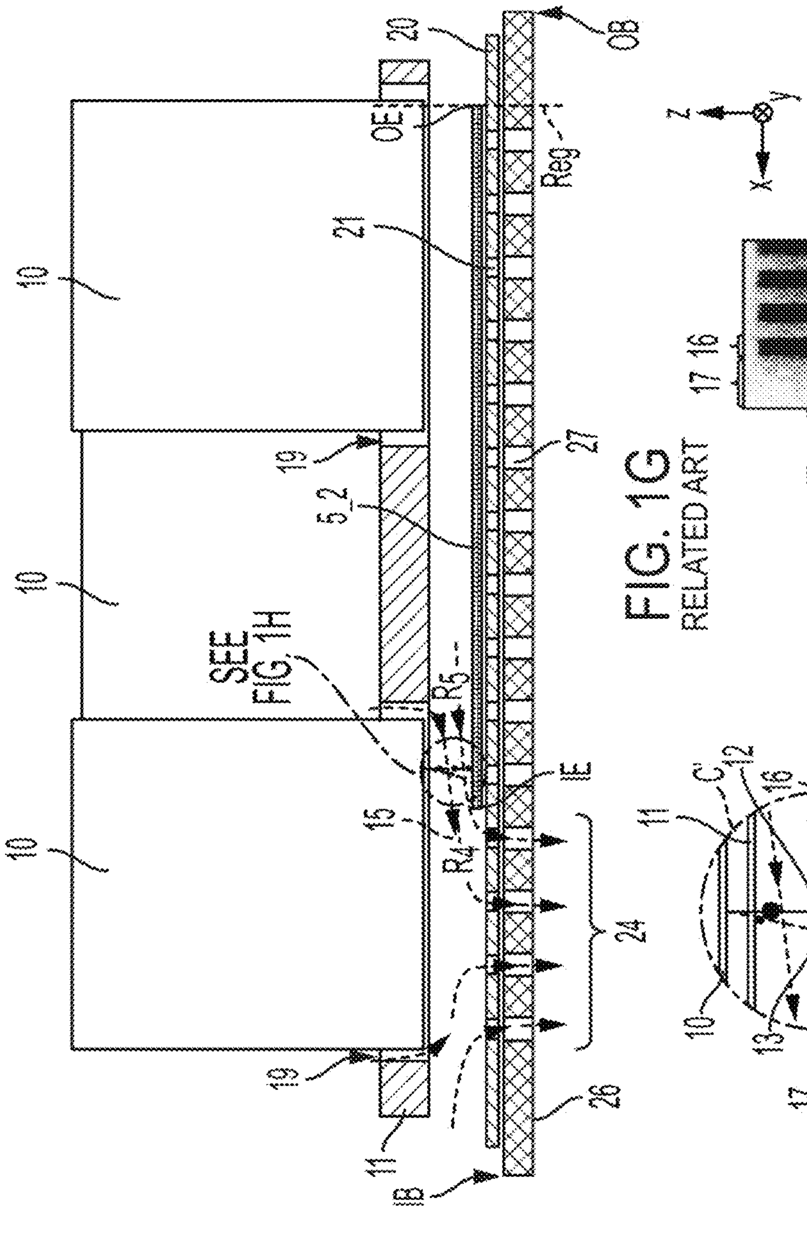
FIG. 1G RELATED ART

As described above, when an inter-media zone is near or under a printhead, the uncovered holes in the inter-media zone can create crossflows that can blow satellite droplets off course and cause image blur. Similarly, uncovered holes along an inboard or outboard side of the print media can also create crossflows that cause image blur. To better illustrate some of the phenomena occurring giving rise to the blurring issues, reference is made to FIGS. 1A-1F. FIGS. 1A, 1D, 1G, and 1J illustrate schematically printheads 10 printing on a print medium 5 near a trail edge TE, a lead edge LE, an inboard edge, and a middle, respectively, of the print medium 5. FIGS. 1A, 1D, and 1J are cross-sections taken through a printhead 10 along a process direction (y-axis direction in the figures), while FIG. 1G is a cross-section taken through the same printhead 10 along a cross-process direction perpendicular to the process direction (x-axis direction in the figures), with the illustration in FIG. 1G depicting an embodiment having three printheads in a series along the x-direction with one being offset from the other two. FIGS. 1B, 1E, 1H, and 1K illustrate enlarged views of the regions A, B, C, and D respectively in FIGS. 1A, AD, 1B, and 1J. FIGS. 1C, 1F, 1I and 1L illustrate enlarged pictures of printed images, the printed images comprising lines printed near the trail edge TE, lead edge LE, inboard edge, and middle, respectively, of a sheet of paper.

As shown in FIGS. 1A, 1D, 1G, and 1J, the inkjet printing system comprises one or more printheads 10 to eject ink to print media 5 through printhead openings 19 in a carrier plate 11. The inkjet printing system also comprises a movable support surface 20 to transport the print media 5 in a process direction P, which corresponds to a positive y-axis direction in the Figures. The movable support surface 20 slides along a top of a vacuum platen 26, and a vacuum environment is provided on a bottom side of the platen 26. The movable support surface 20 has holes 21 and the vacuum platen 26 has platen holes 27. The holes 21 and 27 periodically align as the movable support surface 20 moves thereby exposing the region above the movable support surface 20 to the vacuum below the platen 26. In regions where the print medium 5 covers the holes 21, the vacuum suction through the aligned holes 21 and 27 generates a force that holds the print medium 5 against the movable support surface 20. However, little or no air is drawn into these covered holes 21 and 27 from the environment above the movable support surface 20 since they are blocked by the print medium 5. On the other hand, as shown in FIGS. 1A, 1D, and 1G in the inter-media zone 22 (see FIGS. 1A and 1D) and in the uncovered region 24 near the inboard side IB of the platen 26 (see FIG. 1G), the holes 21 and 27 are not covered by the print media 5, and therefore the vacuum suction pulls air from above the movable support surface 20 to flow down through these holes 21 and 27. This creates airflows, indicated by the dashed arrows in FIGS. 1A, 1D, and 1G which flow from regions around the printhead 10 towards the uncovered holes 21 and 27 in the inter-media zone 22 and the uncovered region 24, with some of the airflows passing under the printhead 10.

In FIG. 1A, the print medium 5_1 is being printed on near its trail edge TE, and therefore the region where ink is currently being ejected ("ink-ejection region") (e.g., region A in FIG. 1A) is located downstream of the inter-media zone 22 (upstream and downstream being defined with respect to the process direction P). Accordingly, some of the air being sucked towards the inter-media zone 22 will flow upstream through the ink-ejection region under the printhead 10. More specifically, the vacuum suction from the inter-media zone 22 lowers the pressure in the region immediately above the inter-media zone 22, e.g., region $R_1$ in FIG. 1A, while the region downstream of the printhead 10, e.g., region $R_2$ in FIG. 1A, remains at a higher pressure. This pressure gradient causes air to flow in an upstream direction from the region $R_2$ to the region $R_1$, with the airflows crossing through a portion of the ink-ejection region (e.g., region A in FIG. 1A) which is between the regions $R_1$ and $R_2$. Airflows such as these, which cross through the ink-ejection region, are referred to herein as crossflows 15. In FIG. 1A, the crossflows 15 flow upstream, but in other situations the crossflows 15 may flow in different directions.

As shown in the enlarged view A' in FIG. 1B, which comprises an enlarged view of the region A in FIG. 1A, as ink is ejected from the printhead 10 towards the medium 5, main droplets 12 and satellite droplets 13 are formed. The satellite droplets 13 are much smaller than the main droplets 12 and have less mass and momentum, and thus the upstream crossflows 15 tend to affect the satellite droplets 13 more than the main droplets 12. Thus, while the main droplets 12 may land on the print medium 5 near their intended deposition location 16 regardless of the crossflows 15, the crossflows 15 may push the satellite droplets 13 away from the intended trajectory so that they land at an unintended location 17 on the medium 5, the unintended location 17 being displaced from the intended location 16. The result of such crossflows and consequent misplaced droplets can be seen in an actual printed image in FIG. 1C, in which a region 16' of denser printed dots corresponding to the intended printed line is formed by droplets (e.g., generally the main droplets 12) which were deposited predominantly at their intended locations, whereas a region 17' of sparser dots dispersed away from the line are formed by droplets (e.g., generally the satellite droplets 13) which were blown away from the intended locations to land in unintended locations. The resulting image has a blurred or smudged appearance for the printed line. Notably, the blurring in FIG. 1C is asymmetrically biased towards the trail edge TE, which would be the expected result of the crossflows 15 near the trail edge TE blowing primarily in an upstream direction. The inter-media zone 22 may also induce other airflows flowing in other directions, such as downstream airflows from an upstream side of the printhead 10, but these other airflows do not pass through the region where ink is currently being ejected in the illustrated scenario and thus do not contribute to image blur. Only those airflows that cross through the ink ejection region are referred to herein as crossflows.

FIGS. 1D-1F schematically illustrate another situation in which such blurring occurs, but this time near the lead edge LE of the print medium 5_2. The cause of blurring near the lead edge LE is similar to that described above in relation to the trail edge TE, except that in the case of printing near the lead edge LE the ink-ejection region is now located upstream of the inter-media zone 22. As a result, the crossflows 15 that are crossing through the ink-ejection region now originate from the upstream side of the printhead 10, e.g., from region $R_3$, and flow downstream to region $R_4$. Thus, as shown in the enlarged view B' of FIG. 1E, which comprises an enlarged view of the region B of FIG. 1D, in the case of printing near the lead edge LE of the print medium 5_2, the satellite droplets 13 are blown downstream towards the lead edge LE of the print medium 5_2 (positive y-axis direction) to land at unintended locations 17, while the main droplets 12 tend to land at or near their intended locations 16. As shown in FIG. 1F, such an effect results in asymmetric blurring that is biased towards the lead edge LE of the print medium (i.e., a denser region 16' of printed dots corresponding to a line is formed with a sparser region 17' of printed dots trailing away from the line toward the lead edge LE).

Figure 1H:
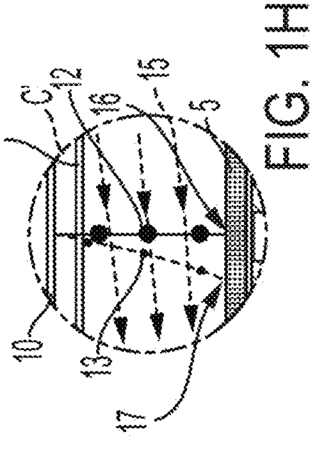
Figure 1I:
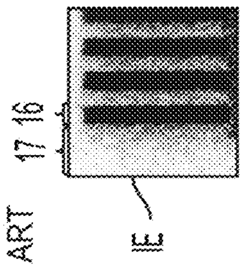
Figure 1J:
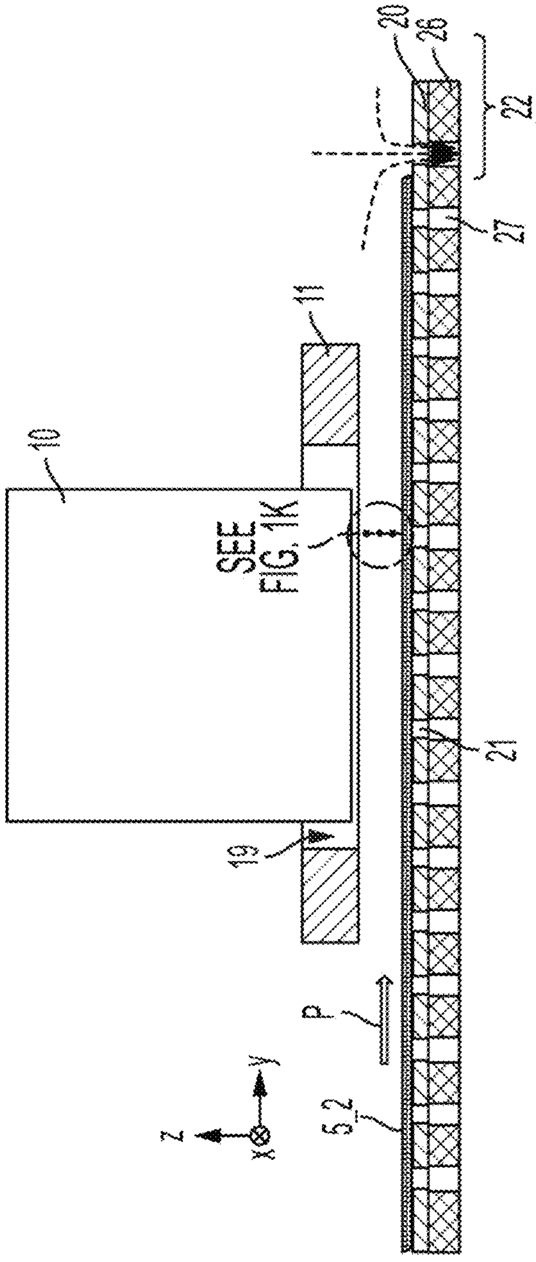
FIG. 1J RELATED ART

FIGS. 1G-1I illustrate yet another situation in which such blurring can occur, but this time near the inboard edge IE of the print medium 5 due to uncovered holes 21, 27 in that region. The cause of blurring near the inboard edge IE is similar to that described above in relation to the trail edge TE and lead edge LE, except that in the case of printing near the inboard edge IE the ink-ejection region is now located outboard of the uncovered region 24 of the holes 21 and 27 in the movable support surface 20 and platen 26. As a result, the crossflows 15 that are crossing through the ink-ejection region now originate from the outboard side of the printhead 10, e.g., from region $R_5$, and flow in an inboard direction towards the region $R_6$. Thus, as shown in the enlarged view C' of FIG. 1H, which comprises an enlarged view of the region C of FIG. 1G, in the case of printing near the inboard edge IE, the satellite droplets 13 are blown inboard towards the inboard edge IE of the print medium 5 (positive y-axis direction) and land at unintended locations 17 rather than at the intended location 16 where main droplets 12 land. As shown in FIG. 1I, such a crossflow pattern is expected to result in asymmetric blurring that is biased towards the inboard edge IE (i.e., a denser region 16' of printed dots corresponding to a line is formed with a sparser region 17' of printed dots trailing away from the line toward the inboard edge IE). In this example, it is assumed that the print media are registered to one side of the printing system (i.e., the outboard side), and thus the image blurring appears on the inboard edge IE. However, in some systems the print media could be centered on the movable support surface, in which case uncovered holes (and hence blurring) may appear on both lateral sides of the print media.

Figure 1K:
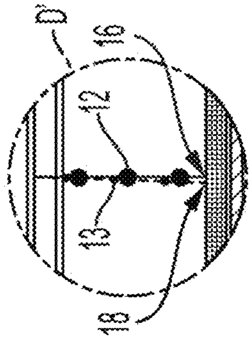
Figure 1L:
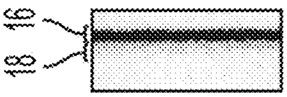

In contrast, as shown in FIG. 1J and the enlarged view D' in FIG. 1K, which corresponds to an enlarged view of region D of FIG. 1J, when printing farther from the edges (trail, leading, or inboard) of the print medium 105 there may be little or no crossflows 15 because the inter-media zone 22 and the uncovered region 24 are too distant to induce much airflow. Because the crossflows 15 are absent or weak farther away from the edges of the print medium 5, the satellite droplets 13 in this region are not as likely to be blown off course. Thus, as shown in FIGS. 1K and 1L, when printing farther from the edges of the print medium 5, the satellite droplets land at the intended location 16 or at locations 18 that are much closer to the intended locations 16 resulting in much less image blurring. The deposition locations 18 of the satellite droplets may still vary somewhat from the intended locations 16, due to other factors affecting the satellite droplets 13, but the deviation is smaller than it would be near the lead or trail edges. FIG. 1L depicts a resulting image of a situation such as that in FIGS. 1J and 1K, showing the printed line presenting droplets landing at intended locations 16' in which and some droplets landing sufficiently close to the intended locations 16' at locations 18'. The resulting image does not show a significantly noticeable blurring or smudged appearance of the line.

Embodiments disclosed herein may, among other things, reduce or eliminate image blur by utilizing an airflow control system that reduces or eliminates the crossflows. With the crossflows reduced or eliminated, the satellite droplets are more likely to land closer to or at their intended deposition locations, and therefore the amount of blur is reduced. Airflow control systems in accordance with various embodiments reduce or eliminate the crossflows by dynamically adjusting the vacuum suction through the vacuum plenum in real time based on the current conditions. In particular, one or more dampers are provided in the vacuum plenum between the vacuum source and the vacuum platen, with the dampers having apertures with adjustable size to provide greater or lesser airflow impedance between the vacuum source and the vacuum platen. Increasing the impedance of the dampers (i.e., making the aperture(s) smaller) results in the rate at which air is sucked from the vacuum plenum into the vacuum source being reduced, thus resulting in an increase in pressure in the vacuum plenum. Conversely, decreasing the impedance of the dampers (i.e., making the aperture(s) bigger) increases the rate of air flowing out of the vacuum plenum and thus decreases the pressure in the vacuum plenum. Airflow control systems may dynamically adjust the impedance of the dampers (i.e., aperture size) to obtain an optimal or desired pressure in the vacuum plenum based on monitoring conditions of the printing system. For example, the airflow control system may include a pressure monitor positioned in the vacuum plenum and may adjust the impedance based on the measured pressure in the vacuum plenum to achieve a desired target pressure.

Controlling the pressure in the vacuum plenum in this manner can help to reduce crossflows while ensuring adequate hold down force is applied to the print media. The lower the pressure in the vacuum plenum, the stronger the vacuum suction through the holes in the movable support surface. Thus, relatively low pressures in the vacuum plenum result in relatively stronger crossflows being pulled through uncovered holes, but also relatively stronger hold down forces being applied to print media. Conversely, relatively higher pressures in the vacuum plenum result in relatively weaker crossflows through uncovered holes, but also relatively weaker hold down force. Thus, the strength of the hold down force and the strength of crossflows vary in a generally inverse manner with the pressure in the vacuum plenum. Accordingly, to reduce the strength of crossflows as much as possible while ensuring adequate hold down force, in some embodiments the pressure inside the vacuum plenum is controlled to be at or near a level that is just sufficient to provide adequate hold down force, but no lower. By controlling the pressure in the vacuum plenum to stay at or near this pressure, the strong crossflows and the lack of hold down that might otherwise occur if the pressure were allowed to vary may be avoided.

One difficulty conventional printing systems may experience with providing and maintaining an optimal pressure in the vacuum plenum, such as the pressure described above, is that, given a fixed strength of suction from a vacuum source, the pressure in the vacuum plenum does not necessarily stay constant throughout a print job or from one print job to the next. The pressure in the vacuum plenum depends not only on the strength of suction from the vacuum source, but also on the airflow impedance through the movable support surface, which changes depending on the current conditions. In particular, the impedance through the movable support surface changes depending on how many of the holes are covered by print media. The more holes that are covered, the greater the impedance through the movable support surface and thus the lower the pressure in the vacuum plenum (i.e., the stronger the vacuum suction) if countermeasures are not taken. Conversely, the fewer holes that are covered, the lower the impedance through the movable support surface and thus the higher the pressure in the vacuum plenum if countermeasures are not taken. Thus, in a situation in which relatively few holes are covered, such as when a first print medium is being loaded onto the movable support surface or when relatively small print media are being used, (assuming no countermeasures) the pressure in the vacuum plenum will be relatively high (i.e., vacuum suction will be relatively lower). But at a later time when more holes are covered because additional print media have been loaded onto the movable support surface and/or a size of the print media has changed, the pressure in the vacuum plenum will be relatively lower (i.e., vacuum suction will be relatively higher) (assuming no countermeasures). Accordingly, if countermeasures are not taken, then the pressure inside the vacuum plenum tends to change from time to time based on the number of holes that are currently covered by print media.

Because the pressure inside the vacuum plenum can change from time to time despite the vacuum source providing a fixed strength of suction, in some systems the strength of suction of the vacuum source may need to be fixed at a sufficiently high level to ensure adequate hold down even in a worst-case-scenario (i.e., relatively few holes are covered). But the strength of suction that ensures adequate hold down in the worst-case-scenario is going to be more suction than is needed to ensure hold down in other scenarios, such as when more holes are covered by print media. Thus, to ensure adequate hold down under all circumstances, the strength of suction that is provided is more than is needed in some circumstance. In such circumstances in which more suction is provided than needed, the relatively stronger suction causes relatively stronger cross-flows and hence image blur.

The above-noted issues are addressed by embodiments disclosed herein by dynamically adjusting the pressure in the vacuum plenum as conditions change. More specifically, the impedance of the dampers can be dynamically adjusted to ensure that a desired pressure is maintained in the vacuum plenum. Because the pressure is adjusted as needed, the strength of suction that is provided to the movable support surface may be maintained at a desired level that is not too high or too low under all relevant circumstances, despite changed conditions. Thus, embodiments disclosed herein can provide adequate hold down force (including the worst-case-scenario) without over provisioning the suction in scenarios that need less suction. Thus, for example, when relatively few holes in the movable support surface are covered, the dampers may provide relatively low impedance (i.e., larger apertures), thus offsetting any increase in the pressure in the vacuum plenum that would otherwise have occurred due to the many uncovered holes. This ensures that the pressure in the vacuum plenum stays sufficiently low to provide adequate hold down despite the many uncovered holes. When more holes in the movable support surface become covered, this would tends to decrease the pressure in the vacuum plenum as described above, but this decrease in pressure may be sensed and the dampers may be adjusted dynamically to offset the decrease in pressure. Specifically, as more holes become covered, the dampers may be controlled to provide relatively higher impedance, which tends to increase the pressure in the plenum, which offsets the decrease in pressure that would otherwise get caused by more holes being covered. Thus, the net effect of adjusting the dampers in the manner described above is that the pressure in the vacuum plenum can be maintained at or near a target value despite changes in the number of the holes that are covered. Thus, rather than providing a strength of suction that is higher than needed under some circumstances in order to ensure enough suction is provided in the worst case scenario, in embodiments disclosed herein a desired amount of suction through the holes can be maintained under all circumstances by controlling the pressure in the vacuum plenum.

Figure 2:
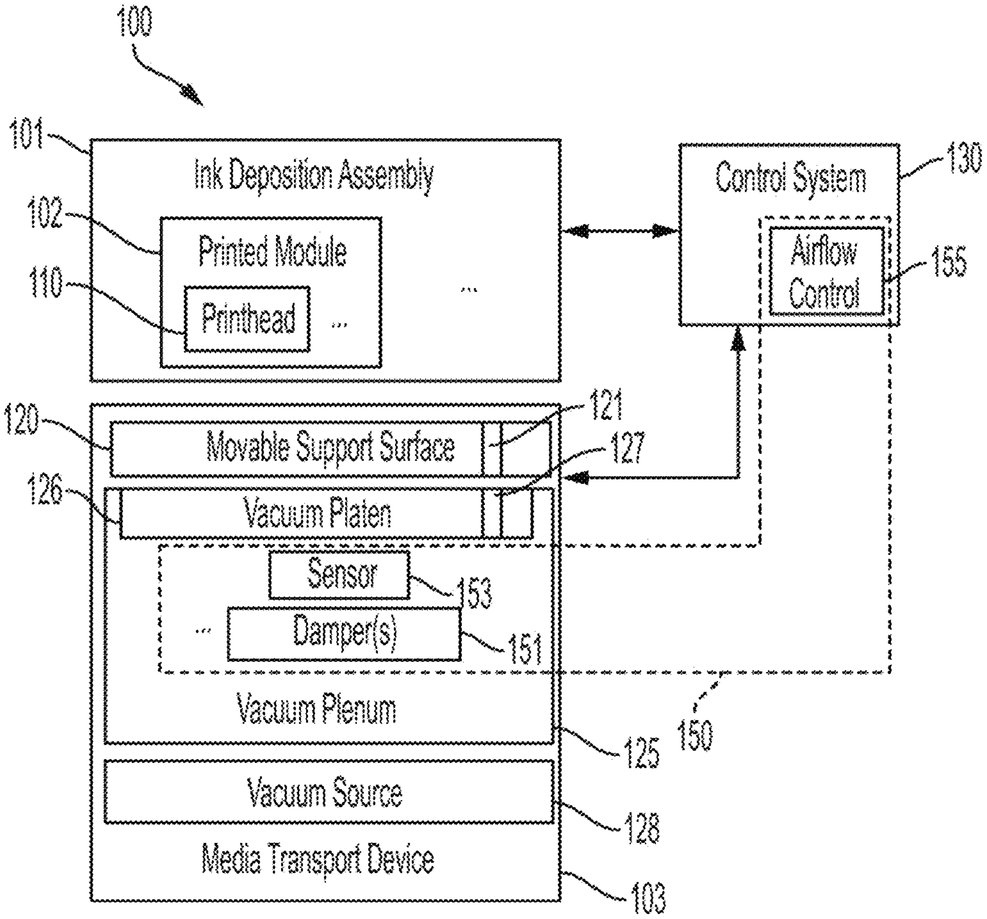
FIG. 2 is a block diagram illustrating components of an embodiment of an inkjet printing system including an air flow control system.

Turning now to FIG. 2, an embodiment of a printing system will be described in greater detail. FIG. 2 is a block diagram schematically illustrates a printing system 100 utilizing the above-described airflow control system. The printing system 100 comprises an ink deposition assembly 101 to deposit ink on print media, a media transport assembly 103 to transport print media through the ink deposition assembly 101, and a control system 130 to control operations of the printing system 100. These components of the printing system 100 are described in greater detail in turn below. In addition, various components of the printing system 100 participate in controlling airflow around the printheads, and thus these parts may be referred to collectively as an airflow control system 150, as explained further below.

The ink deposition assembly 101 comprises one or more printhead modules 102. One printhead module 102 is illustrated in FIG. 2 for simplicity, but any number of printhead modules 102 may be included in the ink deposition assembly 101. In some embodiments, each printhead module 102 may correspond to a specific ink color, such as cyan, magenta, yellow, and black. Each printhead module 102 comprises one or more printheads 110 configured to eject print fluid, such as ink, onto the print media to form an image. In FIG. 2, one printhead 110 is illustrated in the printhead module 102 for simplicity, but any number of printheads 110 may be included per printhead module 102. The printhead modules 102 may comprise one or more walls, including a bottom wall which may be referred to herein as a carrier plate. The carrier plate may comprise printhead openings, and the printheads 110 are arranged to eject their ink through the printhead openings. In some embodiments, the carrier plate supports the printheads 110. In other embodiments, the printheads 110 are supported by other structures. The printhead modules 102 may also include additional structures and devices to support and facilitate operation of the printheads 110, such as, ink supply lines, ink reservoirs, electrical connections, and so on, as known in the art.

As shown in FIG. 2, the media transport device 103 comprises a movable support surface 120, a vacuum plenum 125, a vacuum source 128, and one or more dampers 151. The movable support surface 120 transports the print media through a deposition region of the printing assembly 101. The vacuum plenum 125 supplies vacuum suction to one side of the movable support surface 120 (e.g., a bottom side), and print media is supported on an opposite side of the movable support surface 120 (e.g., a top side). Holes 121 through the movable support surface 120 communicate the vacuum suction through the surface 120, such that the vacuum suction holds down the print media against the surface 120. The movable support surface 120 is movable relative to the printing assembly 101, and thus the print media held against the movable support surface 120 is transported relative to the printing assembly 101 as the movable support surface 120 moves. Specifically, the movable support surface 120 transports the print media through a deposition region of the printing assembly 101, the deposition region being a region in which print fluid (e.g., ink) is ejected onto the print media, such as a region under the printhead(s) 110. The movable support surface 120 can comprise any structure capable of being driven to move relative to the printing assembly 101 and which has holes 121 to allow the vacuum suction to hold down the print media. Such structures can include, but are not limited to, for example a belt, one or more rotatable drums, etc. Those having ordinary skill in the art are familiar with various movable support structures used in printing systems to convey the print media.

The vacuum plenum 125 comprises baffles, walls, or any other structures arranged to enclose or define an environment in which a vacuum state (e.g., low pressure state) is maintained by the vacuum source 128, with the plenum 125 fluidically coupling the vacuum source 128 to the movable support surface 120 such that the movable support surface 120 is exposed to the vacuum state within the vacuum plenum 125. In some embodiments, the movable support surface 120 is supported by a vacuum platen 126, which may be a top wall of the vacuum plenum 125. In such an embodiment, the movable support surface 120 is fluidically coupled to the vacuum in the plenum 125 via platen holes 127 through the vacuum platen 126. In some embodiments, the movable support surface 120 is itself one of the walls of the vacuum plenum 125 and thus is exposed directly to the vacuum in the plenum 125. The vacuum source 128 may be any device configured to remove air from the plenum 125 to create the low-pressure state in the plenum 125, such as a fan, a pump, etc.

The dampers 151 are provided within the vacuum plenum 125 between the vacuum source 128 and the vacuum platen 126 and/or movable support surface 120. The dampers 151, together with baffles or walls coupled to the dampers 151, divide the vacuum platen 125 into two separate compartments: a lower compartment adjacent the vacuum source 128 and an upper compartment adjacent the vacuum platen 126 and/or movable support surface 120. Given this arrangement, the lower compartment will have a lower pressure than the upper compartment at any given time, with the difference in pressure depending on the impedance of the dampers 151 and the impedance through the movable support surface 120. Each damper 151 comprises one or more adjustable apertures through which the vacuum source 128 is placed in fluidic communication with the portion of the vacuum plenum 125 above the dampers 128, or in other words through which the lower compartment of the vacuum plenum 125 is communicably coupled to the upper compartment of the vacuum plenum 125. The sizes of the apertures of the dampers 151 can be adjusted dynamically, thereby changing the airflow impedance between the lower and upper compartments. The smaller the apertures the greater the impedance, and vice-versa. The dampers 151 may comprise, for example, an iris damper, a sliding slot damper (also called a guillotine damper), an opposing blade damper (also called a blade damper or louver damper), a butterfly flat dish damper, an inlet vane damper, or any other device having an aperture with adjustable size. Example embodiments of such dampers are described in greater detail below with respect to FIGS. 4A-6B. The dampers 151 also can be operably coupled to one or more actuators (not illustrated) to automatically actuate the dampers 151 to change the size of the apertures of the dampers 151.

The control system 130 comprises processing circuitry to control operations of the printing system 100. The processing circuitry may include one or more electronic circuits configured with logic for performing the various operations described herein. The electronic circuits may be configured with logic to perform the operations by virtue of including dedicated hardware configured to perform various operations, by virtue of including software instructions executable by the circuitry to perform various operations, or any combination thereof. In examples in which the logic comprises software instructions, the electronic circuits of the processing circuitry include a memory device that stores the software and a processor comprising one or more processing devices capable of executing the instructions, such as, for example, a processor, a processor core, a central processing unit (CPU), a controller, a microcontroller, a system-on-chip (SoC), a digital signal processor (DSP), a graphics processing unit (GPU), etc. In examples in which the logic of the processing circuitry comprises dedicated hardware, in addition to or in lieu of the processor, the dedicated hardware may include any electronic device that is configured to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. The processing circuitry may also include any combination of dedicated hardware and general-purpose processor with software.

The processing circuitry of the control system 130 is also configured with airflow control logic 155, among other things. The airflow control logic 155 controls the impedance of the dampers 151, for example by generating control signals (e.g., digital or analog electrical signals) that cause actuators associated with the dampers 151 to change the size of the aperture(s) of the dampers 151. In some embodiments, the airflow control logic 155 dynamically controls the impedance of the dampers 151 based on detected conditions. Dynamically controlling the impedance refers to automatically and variably adjusting the impedance substantially in real-time responsive to changing conditions. Automatically in this context means that adjustments do not require specific manual interventions by a user in the moment to trigger or effectuate the particular adjustments. However, automatically does not necessarily rule out other more generic user inputs that may be preconditions for adjustments to occur in general but which are not for triggering or effectuating particular adjustments, such as a user turning on the system, starting a print job, selecting an setting that enables adjustments in general, or the like. Adjusting the impedance substantially in real-time refers to the adjustments occurring relatively shortly after the occurrence of the change or stimulus that leads to the adjustment, for example within a few seconds or less. In some embodiments, the airflow control logic 155 is configured to detect the conditions and make the resulting adjustments during normal printing operations of the printing system 100, such as while print media is being loaded onto the movable support surface 120, while print media is being transported, while print fluid is being deposited, and so on. This is in contrast to adjustments to impedance that might occur during manufacture, testing, initialization, shutdown, maintenance, or other such non-printing operations.

As noted above, the airflow control logic 155 controls the impedance of the dampers 151 based on currently detected conditions. In some embodiments, the detected conditions comprise a pressure in the upper compartment of the vacuum plenum 125. For example, a pressure sensor 153 may be provided within the upper compartment of the vacuum plenum 125, and an output signal of the pressure sensor may be operably coupled to the airflow control logic 155 to provide pressure measurements to the airflow control logic 155. The airflow control logic 155 may include logic implementing a control algorithm and thus function as a controller. A target pressure may be set, and the controller may automatically adjust the impedance such that the sensed pressure is maintained at or near (i.e., within a predetermined threshold of) the target pressure. In an embodiment, if the sensed pressure is lower than (or more than a threshold amount lower) the target pressure, the controller may increase the impedance by some amount, and if the sensed pressure is higher than (or more than a threshold amount higher than) the target pressure, the controller may decrease the impedance by some amount. If the sensed pressure is at (or within a threshold amount of) the target pressure, the controller may leave the impedance at its current value. In some embodiments, amounts by which the impedance is increased or decreased may be fixed, predetermined amounts, meaning the controller steps up or down the impedance in discrete steps of fixed size until the sensed pressure is at (or near) the target pressure. In other embodiments, amounts by which the impedance is increased or decreased may be variably set based on various variables/parameters such as the magnitude of the difference between the sensed pressure and the target pressure, a history of the sensed pressure, a direction and rate of change of the sensed pressure (i.e., derivative over time), or any other desired variable as would be known in the art.

One embodiment of a control algorithm that can be utilized is a proportional-integral-derivative (PID) control algorithm, but such is nonlimiting and other known control algorithms that would be familiar to those of ordinary skill in the art may also be utilized. In implementing a PID control algorithm, the pressure can be the sensed process variable and the impedance (i.e., aperture size) the control variable. As the sensed pressure changes, the airflow control logic 155 automatically adjusts the impedance in response so as to maintain the pressure at or near the desired set point (i.e., the target pressure).

The set point or target pressure may be a predetermined value programmed into the airflow control logic 155 in advance of normal operations. For example, the pressure set point may reflect the highest pressure of the upper compartment of the vacuum plenum 125 that will still allow for adequate hold down of the print media. This pressure may be determined experimentally during design or manufacture of the printing system 100, for example by iteratively setting a pressure setpoint for the upper compartment and determining whether print media are adequately held down at that setpoint.

In some embodiments, the detected conditions upon which the adjustments to the dampers 151 are based comprise the number, sizes, and/or locations of the print media that are currently on the movable support surface 120, in addition to or in lieu of the sensed pressure. The print media number/sizes/locations are reflective of the amount (e.g., proportion) of holes in the movable support surface 120 that are currently covered by print media, which determines (at least in part) the pressure in the upper compartment of the vacuum plenum 125, as described above. Thus, the print media number/sizes/locations may be used as a proxy for the pressure in the plenum, and controlling the impedance of the dampers 151 based on the print media number/sizes/locations may allow for the pressure in the vacuum plenum to be maintained at or near a target pressure. Thus, in some embodiments, the control algorithms/controllers described above may use the number, sizes, and/or locations of the print media as sensed process variable(s), in addition to or in lieu of the sensed pressure. In some embodiments the number, sizes, and/or locations of the print media are used directly by the controller as the sensed process variable (i.e., the sensed condition of the system)—in other words the determination of whether to increase or decrease the impedance is based directly on these variables. In other embodiments, the controller may use these variables to determine other information, and the impedance adjustment is then based on this other information. For example, the airflow control logic 155 may deduce from the number, size, and/or location of the print media, the amount (proportion) of holes in the movable support surface 120 that are currently covered by print media, and the impedance adjustment may then be based directly on the determined amount (proportion) of holes.

Accordingly, the airflow control logic 155 can control the impedance of the dampers 151, based on a detected condition of the system (e.g., sensed pressure, print media number/size/location, amount of holes covered, etc.), to maintain a desired pressure within the vacuum plenum 125 despite changing conditions. This allows a relatively high pressure to be maintained in the vacuum plenum even under changing conditions, thus reducing the strength of suction through uncovered holes and therefore reducing the strength of crossflows, while being sufficiently low to ensure adequate hold down of the print media. For example, when relatively few holes are covered, such as when few and/or small print media are on the movable support surface 120, the dampers 151 may be adjusted to provide a relatively low impedance, which tends to decrease the pressure in the upper compartment of the vacuum plenum 125 thus offsetting the increasing in pressure that would have otherwise occurred due to the many uncovered holes. When a relatively large number of holes 121 are covered, such as when many and/or large print media are on the movable support surface 120, the dampers 151 may be adjusted to provide a relatively high impedance, which tends to increase the pressure in the upper compartment of the vacuum plenum 125 thus offsetting the decreasing in pressure that would have otherwise occurred due to the few uncovered holes.

In some embodiments, the detected conditions upon which the adjustments to the dampers 151 are based comprise information about the current print job, such as the image content of images to be printed, the type of print media being used, quality settings or other settings, etc. Some types of image content may be more sensitive to image blur induced by crossflows. For example, images that are printed closer to the edges of the print media (e.g., images with smaller page margins) are more likely to experience blurring of the type described herein, whereas images that are further from the edges of the print media (e.g., images with larger page margins) may be less likely to experience blurring. As another example, certain types of image content, such as bar codes, small writing, fine lines, etc. may be more adversely affected when image blur occurs. Accordingly, the airflow control logic 155 may monitor the image content of images to be printed, and decrease the impedance of the system (thus increasing airflow and vacuum suction) when images are being printed that are less sensitive to image blur (such as images that are not near the edges), and increase the impedance (thus decreasing airflow and vacuum suction) when images are being printed that are more sensitive to image blur (such as images that are closer to the edges or that have sensitive types of images like bar codes). The airflow control logic 155 may also monitor the settings selected for the print job and alter the impedance accordingly. For example, a higher quality setting may entail setting a higher impedance to reduce airflow and hence reduce blurring (together with setting a lower transport speed to avoid lift off of the print media due to the lower suction). Furthermore, different types of print media may need different levels of vacuum suction to remain flat against the movable support surface without lift off, wrinkling, or curling of edges. For example, relatively rigid and/or thick substrates may be more resistant to wrinkling or curling than more flexible and/or thin substrates, and thus more vacuum suction may be needed to hold the relatively flexible and/or thin substrates flat against the movable support surface. Thus, the airflow control logic 155 may monitor the type or print media being used, and adjust the impedance accordingly (i.e., higher impedance for print media that need less suction to stay flat, lower impedance for print media that need more suction to stay flat).

In some embodiments, the airflow control logic 155 may consider multiple conditions of the system and base the adjustments of the impedance on those multiple conditions. In particular, any of the conditions described above may be used in any combination. For example, in some embodiments, the detected conditions related to information about the current print job (e.g., image content, media type, settings, etc.) may be considered in combination with the detected conditions related to the pressure of the plenum (e.g., the sensed pressure, the number/size of print media, the amount of uncovered holes, etc.). For example, the airflow control logic 155 may variably adjust the target pressure used by the control algorithm based on the information about the current print job, and then variably adjust the impedance of the dampers 151 based on the target pressure and based on the pressure-related conditions as described above.

Figure 3:
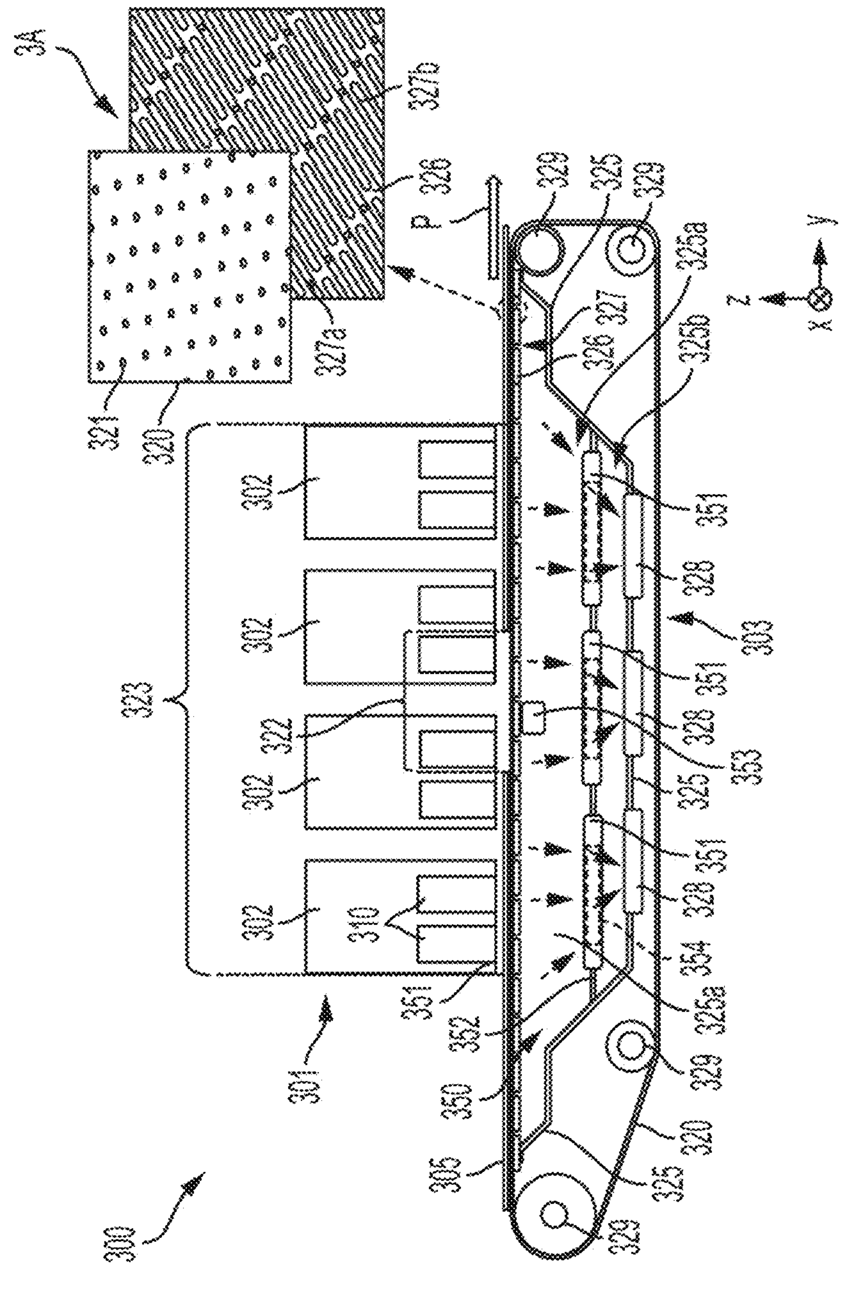
FIG. 3 is a schematic illustration of components of an embodiment of an inkjet printing system.

FIG. 3 illustrate another embodiment of a printing system 300, which may be used as the printing system 100 described above with reference to FIG. 2. FIG. 3 comprises a schematic illustrating a portion of the printing system 300 from a side view.

As illustrated in FIG. 3, the printing system 300 compromises an ink deposition assembly 301, a media transport device 303, and an airflow control system 350, which can be used as the ink deposition assembly 101, media transport device 103, and airflow control system 150, respectively, which were described above with reference to FIG. 2. The printing system 300 may also comprise additional components not illustrated in FIG. 3, such as a control system (e.g., similar to control system 130) including airflow control logic (e.g., similar to airflow control logic 155).

In the printing system 300, the ink deposition assembly 301 comprises four printhead modules 302 as shown in FIG. 3, with each module 302 having three printheads 310 (two printhead 110 are visible in FIG. 3, while a third printhead is obscured behind one of the other printheads 110). The printhead models 302 are arranged in series along a process direction P above the media transport device 303, such that the print media 305 is transported sequentially through an ink deposition region 323 of the ink deposition assembly, i.e., beneath each of the printhead modules 302. The printheads 310 are arranged to eject print fluid (e.g., ink) through respectively corresponding openings in a corresponding carrier plate, with a bottom end of the printhead 310 extending down partway into the opening. In this embodiment, the printheads 310 are arranged in an offset pattern with two printheads 310 being aligned in a cross-process direction (only one is visible in FIG. 3) and one of the printheads 310 being offset further upstream or downstream than the other two printheads 310, with the offset printhead being arranged between the two other printheads 310 in the cross-process direction. In other embodiments, different numbers and/or arrangements of printheads 310 and/or printhead modules 302 are used.

In the printing system 300, media transport device 303 comprises a flexible belt providing the movable support surface 320. As shown in FIG. 3, the movable support surface 320 is driven by rollers 329 (the number and arrangement of which in FIG. 3 is nonlimiting as those of ordinary skill in the art would appreciate) to move along a looped path, with a portion of the path passing through the ink deposition region 323 of the ink deposition assembly 301. Furthermore, in this embodiment, the vacuum plenum 325 comprises a vacuum platen 326, which forms a top wall of the plenum 325 and supports the movable support surface 320. The platen 326 comprises platen holes 327, which allow fluidic communication between the interior of the plenum 325 and the underside of the movable support surface 320.

In some embodiments, the platen holes 327 may include channels on a top side thereof, as seen in the expanded cutaway 3A of FIG. 3, which may increase an area of the opening of the holes 327 on the top side thereof. Specifically, the platen holes 327 may include a bottom portion 327*a* which opens to a bottom side of the platen 326 and a top portion 327*b* which opens to a top side of the platen 326, with the top portion 327*b* being differently sized and/or shaped than the bottom portion 327*a*. For example, FIGS. 3-6C illustrate an embodiment of the platen holes 327 in which the top portion 327*b* is a channel elongated in the process direction while the bottom portion 327*a* is a through-hole that is less-elongated and has a smaller sectional area (see the enlargement D in FIG. 3). In some embodiments, multiple holes 327 may share the same top portion 327*b*, or in other words multiple bottom portions 327*a* may be coupled to the same top portion 327*b*. References herein to the airflow zones 351 blocking a hole 327 refer to blocking at least the bottom portion 327*a* of the hole 327.

The holes 327 are arranged in columns extending in the process direction P and rows extending in a cross-process direction (the x-direction shown in FIG. 3), with each column comprising a group of holes 327 that are aligned with one another in the process direction P and each row comprising a group of one or more holes 327 aligned with one another in a cross-process direction. In some embodiments, the columns and rows are arranged in a regular grid, but in other embodiments the columns and rows are arranged in other patterns that do not form a regular grid.

The holes 321 of the movable support surface 320 are disposed such that each hole 321 is aligned in the process direction P (y-axis direction) with a collection of corresponding platen holes 327. In other words, in the printing system 300, each hole 321 is aligned in the with one of the columns of platen holes 327. Thus, as the movable support surface 320 slides across the platen 326, each hole 321 in the movable support surface 320 will periodically move over a corresponding platen hole 327, resulting in the movable support surface hole 321 and the platen hole 327 being temporarily vertically aligned (i.e., aligned in a z-axis direction). When a hole 321 of the movable support surface 320 moves over a corresponding platen hole 327, the holes 321 and 327 define an opening that fluidically couples the environment above the movable support surface 320 to the low-pressure state in the vacuum plenum 325, thus generating vacuum suction through the holes 321 and 327. This suction generates a vacuum hold down force on a print medium 305 if the print medium 305 is disposed above the hole 321.

As shown in FIG. 3, the airflow control system 350 comprises dampers 351. The dampers 351 of FIG. 3 may be used as the dampers 151 described above in relation to FIG. 2. An example arrangement of three dampers 351 is illustrated in FIG. 3, but in other embodiments any number of dampers 351 may be provided and they may have different sizes, shapes, and locations than those illustrated. As shown in FIG. 3, the dampers 351 and one or more baffles 352 are arranged in the vacuum plenum 325 between the vacuum sources 328 (e.g., fans, pumps, etc.) and the vacuum platen 326. The dampers 351 and baffles 352 separate the vacuum plenum 325 into an upper compartment 325*a* and a lower compartment 325*b* and control airflow between these compartments 325*a*, 325*b*. Thus, the dampers 351 control the strength of suction that is provided from the vacuum sources 328 to the holes 327 in the vacuum platen 326. The dampers 351 each have one or more apertures 354 (indicated by dashed lines in FIG. 3) which communicably coupled the upper compartment 325*a* with the lower compartment 325*b*. The size of the apertures 354 is changeable by an actuator (not illustrated), thus changing the impedance of the dampers 351. The structure and function of the dampers 351 is similar to that of the dampers 151, and thus further duplicative description thereof is omitted.

The airflow control system 350 is configured to control the impedance of the dampers 351 based on currently detected conditions. For example, the airflow control system 350 comprises a pressure sensor 353 arranged in the upper compartment 325*a*. The pressure sensor 353 senses the pressure in the upper compartment 325*a* (periodically or continuously) and communicates information indicative of the sensed pressure to a controller (not illustrated) of the airflow control system 350. The controller of the airflow control system 350 may be similar to the airflow control logic 155 described above, and may control the impedance of the dampers 351 (i.e., control the sizes of the apertures 354) based on the pressure information as described above with respect to the airflow control logic 155.

Example embodiments of various types of dampers, specifically the dampers 451, 551, and 651, will be described in greater detail below with reference to FIGS. 4A-6B. The dampers 451, 551, and 651 may be used as the dampers 151 or 351. Control and operation of the dampers 451, 551, and 651 may be similar to that of the dampers 151 and 351 described above, and thus duplicative description thereof is omitted.

Figure 4B:
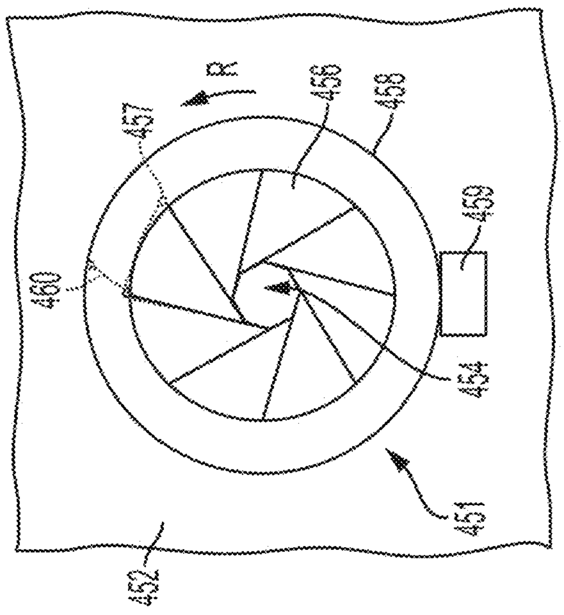
FIGS. 4A and 4B are plan views of an embodiment of a damper.
Figure 4A:
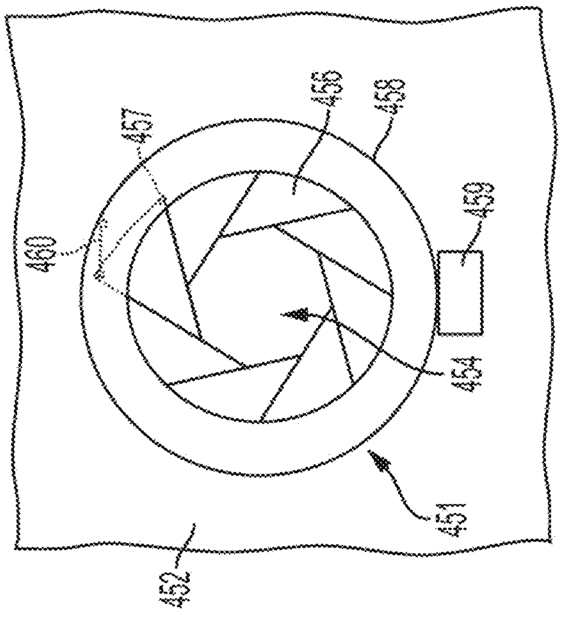

FIGS. 4A-4B illustrate example dampers 451. The dampers 451 are iris-type dampers, which comprise a number of tapered blades 456 arranged circumferentially around a generally circular opening in a baffle 452 with a narrow end of each blade 456 pointed towards the center of the opening and a wide end of each blade 456 pivotably attached to the baffle 452. The blades 452 are arranged such that they collectively interact to define an aperture 454. For example, the blades 452 may partially overlap one another and/or be positioned with edges adjacent to one another to define the aperture 454. The size of the aperture 454 is changed by pivoting each of the blades 452, thus moving the narrow ends of the blades 452 closer together to reduce the size of the aperture 454 or moving the narrow ends of the blades 452 further apart to increase the size of the aperture 454. In the illustrated example, the blades 452 are roughly triangular in shape, but other shapes could be used instead. In FIGS. 4A and 4B, hidden portions of one of the blades 456 are shown in dashed lines. As illustrated, one end of the blades 456 is coupled to a pivot 457 fixed relative to the baffle 452. Another end of the blade 456 is coupled to a ring 458 via a linkage 460. The ring 458 is rotated around a central axis thereof by an actuator 459, and this rotation of the ring 458 is translated into pivoting of the blade 456 via the linkage 460 and pivot 457. For example, transitioning from the state illustrated in FIG. 4A to the state illustrated in FIG. 4B can occur by rotating the ring 458 counter-clockwise (the direction R). The actuator 459 may be an electric motor, a solenoid, a hydraulic or pneumatic piston, or any other device capable of imparting motion to the ring 448. For example, if the actuator 459 drives a rotating output, the ring 458 may include gearing that interacts with the rotating drive output to convert rotation of the output into rotation of the ring 458. As another example, if the actuator 459 is a linear actuator, a linear motion output of the actuator 459 may be coupled to one side of the ring 458 such that translation of the linear motion output is converted into rotation of the ring 458. Other known types of iris dampers, with which those having ordinary skill in the art have familiarity, may be used as the damper 451.

Figure 5A:
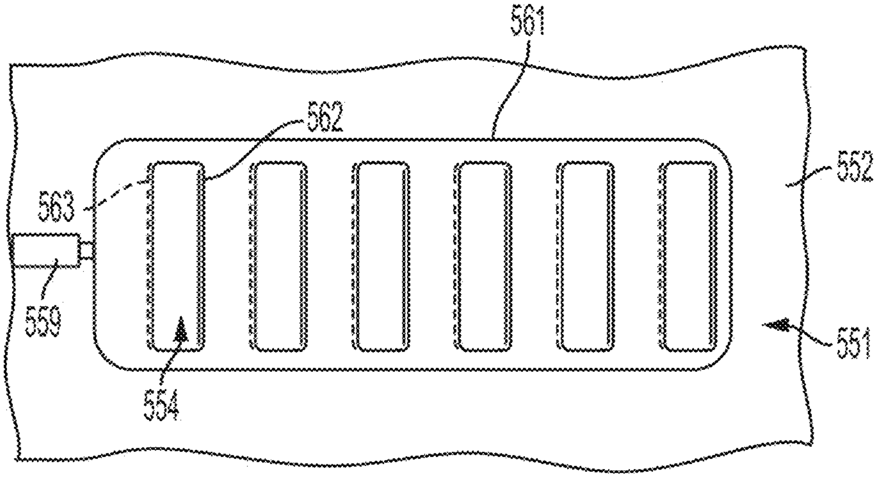
FIGS. 5A and 5B are plan views of an embodiment of a damper.
Figure 5B:
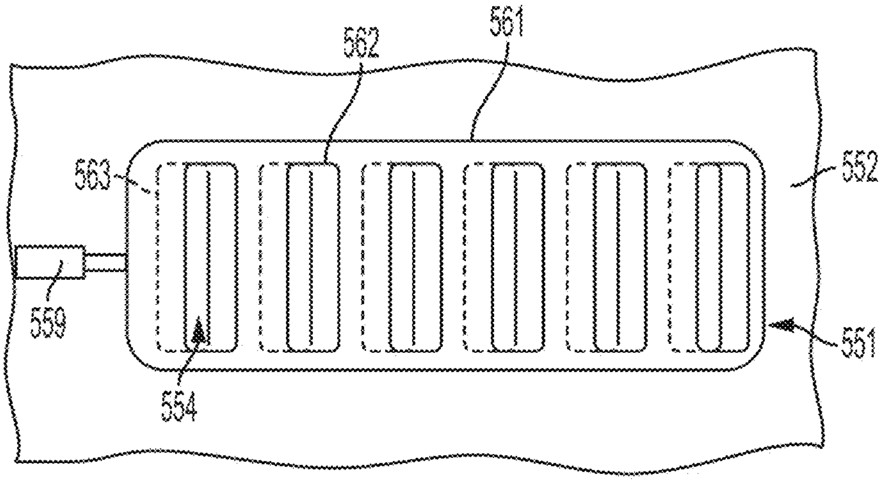

FIGS. 5A and 5B illustrate another embodiment of a damper that can be used in accordance with embodiments of the present disclosure, which may be referred to as a sliding slot damper or guillotine damper. In FIGS. 5A and 5B, the damper 551 comprises a plate 561 with a number of slots 562 or other openings. The plate 561 is positioned against a baffle 552, and the slots 562 partially or fully overlap corresponding slots 563 in the baffle 552. The aperture 554 is defined by the overlapping of the slots 562 and slots 563. The size of the aperture 554 is changed by changing the degree of overlap between the slots 562 and slots 563 by moving the plate 561 relative to the slots 563. When the slots 562, 563 fully align and overlap, the size of the aperture 554 is at its largest. As the slots move out of alignment, the size of the aperture decreases until a point where the slots 562, 563 are not aligned at all and no aperture 554 exists (i.e., it is closed). An actuator 559 imparts the movement to the plate 561 to move it relative to the baffle 552 (e.g., to the left and right in the orientation of FIGS. 5A and 5B). For example, the actuator 559 may be a solenoid, a hydraulic or pneumatic piston, a rotary actuator (e.g., electric motor) together with a rotary-to-linear conversion mechanism, or any other device capable of imparting translational motion to the plate 561.

Figure 6A:
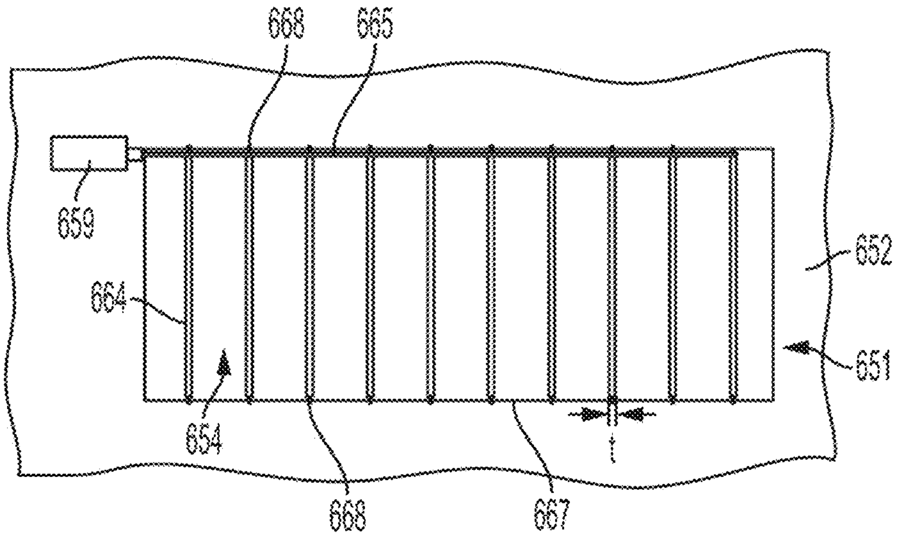
FIGS. 6A and 6B are plan views of an embodiment of a damper.
Figure 6B:
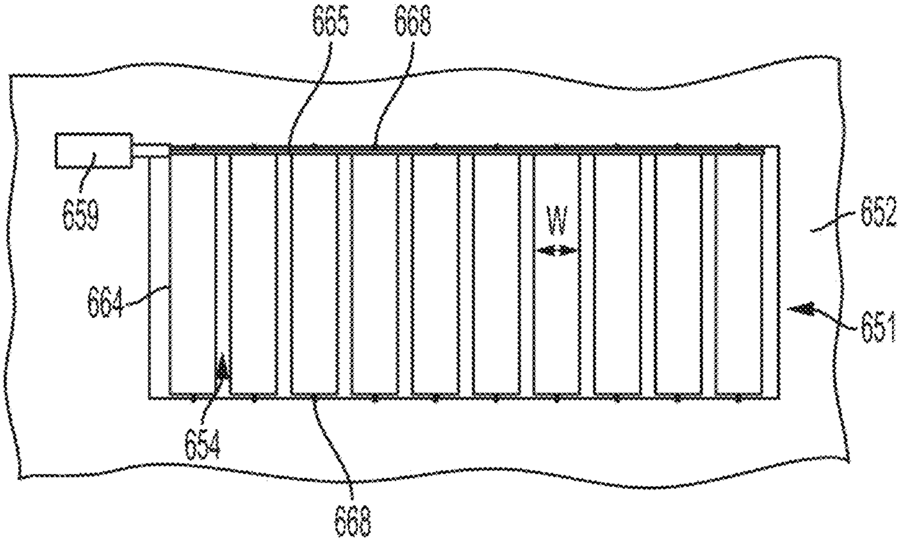

FIGS. 6A and 6B illustrate yet another embodiment of a damper that can be used in conjunction with embodiments of the present disclosure, which may be referred to as a blade damper. The damper 651 in FIGS. 6A and 6B are so-called opposing blade dampers, which comprise a number of blades 664 extending in parallel across an opening 667 in the baffle 552. The blades 664 are pivotably coupled to the baffle 552 at both ends thereof by pivots 668. The apertures 654 are defined by the open spaces between and around the blades 664. In other words, the apertures correspond to the portions of the opening 667 that are not occluded by the blades 664. The blades 664 have a wide face that has a width w (see FIG. 6B) and a narrow face that has thickness t (see FIG. 6A), and thus by rotating the blades 664 about their pivots 668, the space between the blades 664 can be changed. In other words, rotating the blades 664 changes the amount of the opening 667 that is occluded by the blades 664. For example, in FIG. 6A the blades 664 are oriented with their narrow faces parallel to the baffle 652, and therefore there is a relatively wide gap between each blade 664 (i.e., blades 664 occlude very little of the opening 667). However, in FIG. 6B the blades are oriented with their wide face approximately parallel to the baffle 652, and thus the gaps between blades 664 are relatively narrow (i.e., the blades 664 occlude most of the opening 667, or in some embodiments all of the openings 667 are occluded). Thus, the sizes of the apertures 654 can be varied by rotating the blades 664. One end of each blade 664 may all be coupled to an arm 665, such that translation of the arm causes the blades 664 to all rotate together. The arm 665 is coupled to an actuator 659, which drives translation of the arm. Thus, the actuator 659 can control the rotation of the blades 664, and thus the size of the apertures 654. For example, the actuator 559 may be a solenoid, a hydraulic or pneumatic piston, a rotary actuator (e.g., electric motor) together with a rotary-to-linear conversion mechanism, or any other device capable of imparting motion to the arm 665.

Figure 7B:
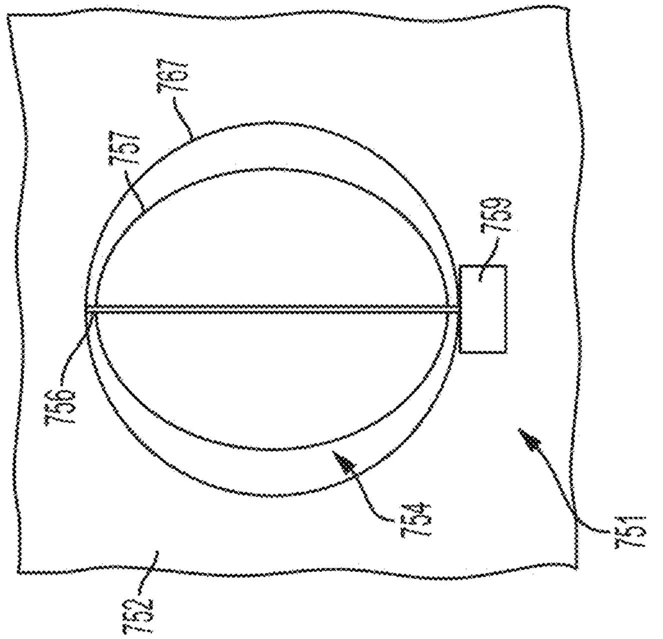
FIGS. 7A and 7B are plan views of an embodiment of a damper.
Figure 7A:
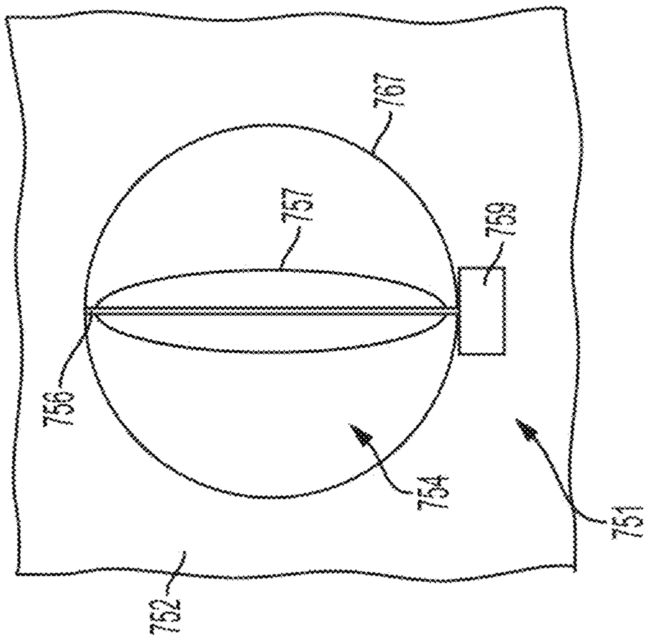

FIGS. 7A and 7B illustrate yet another embodiment of a damper that can be used in conjunction with embodiments of the present disclosure. The damper 751 in FIGS. 7A and 7B are so-called butter fly flat dish dampers, which comprise a dish 757 that is coupled to a pivot 755 that extends across an opening 767. The pivot is rotatable, and as the pivot rotates the dish rotates. The apertures 754 are defined by the open spaces between dish 757 and the rim of the opening 767. As the dish 757 rotates, the space between the dish 757 and the rim of the opening 767 decreases, thus reducing the size of the aperture 754. For example, in FIG. 7A the dish 757 is oriented at a relatively steep angle relative to the baffle 752, and therefore there are relatively wide gaps between the dish 757 and the rim of the opening 767. However, in FIG. 7B the dish 757 is oriented closer to being parallel to the baffle 752, and thus the gaps between dish 757 and the rim of the opening 767 are relatively narrow (i.e., the dish 757 occludes most of the opening 767, or in some embodiments all of the opening 767 is occluded). Thus, the sizes of the aperture 754 can be varied by rotating the dish 757 (via rotation of the pivot). The pivot 756 is coupled to an actuator 759, which drives rotation of the pivot 756. For example, the actuator 559 may be a solenoid, a hydraulic or pneumatic piston, a rotary actuator (e.g., electric motor) together with a rotary-to-linear conversion mechanism, or any other device capable of imparting motion to the pivot 756

This description and the accompanying drawings that illustrate inventive aspects and embodiments should not be taken as limiting—the claims define the protected invention. Various mechanical, compositional, structural, electrical, and operational changes may be made without departing from the spirit and scope of this description and the claims. In some instances, well-known circuits, structures, and techniques have not been shown or described in detail in order not to obscure the invention. Like numbers in two or more figures represent the same or similar elements.

Further, the terminology used herein to describe aspects of the invention, such as spatial and relational terms, is chosen to aid the reader in understanding embodiments of the invention but is not intended to limit the invention. For example, spatially terms—such as "upstream", "downstream", "beneath", "below", "lower", "above", "upper", "inboard", "outboard", "up", "down", and the like—may be used herein to describe directions or one element's or feature's spatial relationship to another element or feature as illustrated in the figures. These spatial terms are used relative to the poses illustrated in the figures, and are not limited to a particular reference frame in the real world. Thus, for example, the direction "up" in the figures does not necessarily have to correspond to an "up" in a world reference frame (e.g., away from the Earth's surface). Furthermore, if a different reference frame is considered than the one illustrated in the figures, then the spatial terms used herein may need to be interpreted differently in that different reference frame. For example, the direction referred to as "up" in relation to one of the figures may correspond to a direction that is called "down" in relation to a different reference frame that is rotated 180 degrees from the figure's reference frame. As another example, if a device is turned over 180 degrees in a world reference frame as compared to how it was illustrated in the figures, then an item described herein as being "above" or "over" a second item in relation to the Figures would be "below" or "beneath" the second item in relation to the world reference frame. Thus, the same spatial relationship or direction can be described using different spatial terms depending on which reference frame is being considered. Moreover, the poses of items illustrated in the figure are chosen for convenience of illustration and description, but in an implementation in practice the items may be posed differently.

The term "process direction" refers to a direction that is parallel to and pointed in the same direction as an axis along which the print media moves as is transported through the deposition region of the ink deposition assembly. Thus, the process direction is a direction parallel to the y-axis in the Figures and pointing in a positive y-axis direction.

The term "cross-process direction" refers to a direction perpendicular to the process direction and parallel to the movable support surface. At any given point, there are two cross-process directions pointing in opposite directions, i.e., an "inboard" cross-process direction and an "outboard" cross-process direction. Thus, considering the reference frames illustrated in the Figures, a cross-process direction is any direction parallel to the x-axis, including directions pointing in a positive or negative direction along the x-axis. References herein to a "cross-process direction" should be understood as referring generally to any of the cross-process directions, rather than to one specific cross-process direction, unless indicated otherwise by the context. Thus, for example, the statement "the valve is movable in a cross-process direction" means that the valve can move in an inboard direction, outboard direction, or both directions.

The terms "upstream" and "downstream" may refer to directions parallel to a process direction, with "downstream" referring to a direction pointing in the same direction as the process direction (i.e., the direction the print media are transported through the ink deposition assembly) and "upstream" referring to a direction pointing opposite the process direction. In the Figures, "upstream" corresponds to a negative y-axis direction, while "downstream" corresponds to a positive y-axis direction. The terms "upstream" and "downstream" may also be used to refer to a relative location of element, with an "upstream" element being displaced in an upstream direction relative to a reference point and a "downstream" element being displaced in a downstream direction relative to a reference point. In other words, an "upstream" element is closer to the beginning of the path the print media takes as it is transported through the ink deposition assembly (e.g., the location where the print media joins the movable support surface) than is some other reference element. Conversely, a "downstream" element is closer to the end of the path (e.g., the location where the print media leaves the support surface) than is some other reference element. The reference point of the other element to which the "upstream" or "downstream" element is compared may be explicitly stated (e.g., "an upstream side of a printhead"), or it may be inferred from the context.

The terms "inboard" and "outboard" refer to opposite sides of the media transport device along a cross-process direction. "Outboard" refers to the side of the media transport device closest to a registration location to which the edges of the print media are registered. "Inboard" refers to the side of the media transport device opposite from the outboard side. For example, in FIGS. 6A-6B the outboard side of the media transport device is labeled OB and the inboard side of the media transport device is labeled IB. The terms "inboard" and "outboard" are also used to refer to cross-process directions, with "inboard" referring to a cross-process direction that points from the outboard side to the inboard side and "outboard" referring to the cross-process direction that points from the inboard side to the outboard side. In the Figures, "inboard" corresponds to a positive x-axis direction, while "outboard" corresponds to a negative x-axis direction. The terms "inboard" and "outboard" also refer to relative locations, with an "inboard" element being displaced in an inboard direction relative to a reference point and with an "outboard" element being displaced in an outboard direction relative to a reference point. The reference point may be explicitly stated (e.g., "an inboard side of a printhead"), or it may be inferred from the context. Thus, for example, an "inboard side of a carrier plate" refers to a side of the carrier plate that is relatively further inboard than another side of the carrier plate. In systems in which the print media are not registered to an edge (e.g., the print media are centered), an arbitrary side of the system may be referred to as the outboard side and the opposite side may be the inboard side.

The term "vertical" refers to a direction perpendicular to the movable support surface in the deposition region. At any given point, there are two vertical directions pointing in opposite directions, i.e., an "upward" direction and an "downward" direction. Thus, considering the reference frames illustrated in the Figures, a vertical direction is any direction parallel to the z-axis, including directions pointing in a positive z-axis direction ("up") or negative z-axis direction ("down").

The term "horizontal" refers to a direction parallel to the movable support surface in the deposition region (or tangent to the movable support surface in the deposition region, if the movable support surface is not flat in the deposition region). Horizontal directions include the process direction and cross-process directions.

The term "vacuum" has various meanings in various contexts, ranging from a strict meaning of a space devoid of all matter to a more generic meaning of a relatively low pressure state. Herein, the term "vacuum" is used in the generic sense, and should be understood as referring broadly to a state or environment in which the air pressure is lower than that of some reference pressure, such as ambient or atmospheric pressure. The amount by which the pressure of the vacuum environment should be lower than that of the reference pressure to be considered a "vacuum" is not limited and may be a small amount or a large amount. Thus, "vacuum" as used herein may include, but is not limited to, states that might be considered a "vacuum" under stricter senses of the term.

The term "air" has various meanings in various contexts, ranging from a strict meaning of the atmosphere of the Earth (or a mixture of gases whose composition is similar to that of the atmosphere of the Earth), to a more generic meaning of any gas or mixture of gases. Herein, the term "air" is used in the generic sense, and should be understood as referring broadly to any gas or mixture of gases. This may include, but is not limited to, the atmosphere of the Earth, an inert gas such as one of the Noble gases (e.g., Helium, Neon, Argon, etc.), Nitrogen ($N_2$) gas, or any other desired gas or mixture of gases.

In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. A printing system, comprising:

an ink deposition assembly comprising one or more printheads arranged to eject ink to a deposition region of the ink deposition assembly;

a media transport device comprising a vacuum source, a vacuum plenum, and a movable support surface, the media transport device configured to hold print media against the movable support surface by vacuum suction through holes in the movable support surface and transport the print media along a process direction though the deposition region, the vacuum suction being communicated from the vacuum source to the holes via the vacuum plenum; and an airflow control system comprising a damper arranged in the vacuum plenum, the damper having an adjustable impedance to airflow through the damper between the vacuum source and the holes, wherein the airflow control system is configured to dynamically adjust the impedance of the damper based on one or more of:

a sensed pressure in the vacuum plenum;

an amount of the holes currently covered by print media;

the number of print media currently being transported by the movable support surface; or image content associated with a current print job.

2. The printing system of claim 1, wherein the vacuum plenum comprises a vacuum platen to support the movable support surface, wherein the vacuum platen comprises platen holes to supply the vacuum suction from the vacuum plenum to the holes of the movable support surface;

wherein the airflow control system comprises a damper unit comprising one or more dampers arranged in the vacuum plenum between the vacuum platen and the vacuum source such that all air flowing between the vacuum platen and the vacuum source passes through the one or more dampers of the damper unit, the damper being one of the one or more dampers;

wherein the damper unit has an adjustable impedance to airflow through the one or more dampers, the impedance controlling airflow between the vacuum source and each of the platen holes, wherein the airflow control system is configured to adjust the impedance of the damper unit to control airflow through all of the platen holes based on a detected condition of the printing system.

3. The printing system of claim 2, wherein the airflow control system is configured to dynamically adjust the impedance of the damper unit based on the detected condition.

4. The printing system of claim 2, further comprising:

a pressure sensor in the vacuum plenum, the pressure sensor configured to sense pressure in the vacuum plenum, wherein the detected condition comprises the pressure sensed by the pressure sensor.

5. The printing system of claim 4, wherein the airflow control system is configured to adjust the impedance of the damper unit to maintain a target pressure in the vacuum plenum.

6. The printing system of claim 4, wherein the vacuum plenum is separated, at least in part by the damper unit, into a first compartment fluidically coupled to the vacuum source and a second compartment fluidically coupled to the holes of the movable support surface, wherein the first compartment and the second compartment are configured to be placed in fluidic communication through the damper, and wherein the pressure sensor is in the second compartment.

7. The printing system of claim 2, wherein the detected condition comprises the amount of the holes of the movable support surface that are currently covered by the print media.

8. The printing system of claim 7, wherein the airflow control system is configured to adjust the impedance of the damper unit in response to a change in the amount of the holes of the movable support surface that are currently covered by the print media so as to maintain a target pressure in the vacuum plenum.

9. The printing system of claim 2, wherein the detected condition comprises the image content associated with the current print job.

10. The printing system of claim 2, further comprising:

wherein the damper unit comprises a plurality of dampers; and wherein the vacuum plenum is separated, at least in part by the plurality of dampers, into a first compartment fluidically coupled to the vacuum source and a second compartment fluidically coupled to the holes of the movable support surface, wherein the first compartment and the second compartment are configured to be placed in fluidic communication through the dampers.

11. The printing system of claim 2, further comprising:

wherein the vacuum plenum is separated, at least in part by the damper unit, into a first compartment fluidically coupled to the vacuum source and a second compartment fluidically coupled to the holes of the movable support surface, wherein the first compartment and the second compartment are configured to be placed in fluidic communication through the damper unit.

12. The printing system of claim 2, wherein the one or more dampers of the damper unit comprise at least one of an iris damper, a sliding shutter damper, a blade damper, or a butterfly flat dish damper.

13. The printing system of claim 2, wherein the one or more dampers of the damper unit comprise one or more apertures and the airflow control system is configured to adjust the impedance of the damper by adjusting a size of the one or more apertures.

14. The printing system of claim 13, wherein the airflow control system further comprises an actuator operably coupled to the damper unit, the actuator configured to adjust the size of the one or more apertures.

15. The printing system of claim 2, wherein the movable support surface comprises a belt configured to move relative to the vacuum platen.

16. A method comprising:

transporting one or more print media through a deposition region of a printhead of a printing system, wherein the print media are held during the transporting against a movable support surface of a media transport device via vacuum suction through holes in the media transport device, the vacuum suction being communicated from a vacuum source to the holes via a vacuum plenum;
ejecting print fluid from the printhead to deposit the ink to the print media in the deposition region;
detecting a condition comprising one or more of:
a sensed pressure in the vacuum plenum;
an amount of the holes currently covered by print media;
the number of print media currently being transported by the movable support surface; or
image content associated with a current print job; and
controlling an airflow control system to dynamically adjust an impedance of a damper arranged in the vacuum plenum based the detected condition such that the impedance of the damper is adjusted in response to a change in one or more of:
the sensed pressure in the vacuum plenum;
the amount of the holes currently covered by print media;
the number of print media currently being transported by the movable support surface; or
the image content associated with a current print job,
wherein the impedance of the damper controls airflow between the vacuum source and the holes.

17. The method of claim 16,
wherein the vacuum plenum comprises a vacuum platen to support the movable support surface, wherein the vacuum platen comprises platen holes to supply the vacuum suction from the vacuum plenum to the holes of the movable support surface;
wherein controlling the airflow control system to dynamically adjust the impedance of the damper based the detected condition comprises controlling the airflow control system to dynamically adjust an impedance of a damper unit comprising one or more dampers arranged in the vacuum plenum to control airflow through all of the platen holes based on the detected condition, the one or more dampers comprising the damper; and
wherein the damper unit is positioned between the vacuum platen and the vacuum source such that all air flowing between the vacuum platen and the vacuum source passes through the damper unit and the impedance of the damper unit controls airflow between the vacuum source and each of the platen holes.

18. The method of claim 17,
wherein dynamically adjusting the impedance of the damper unit includes adjusting a size of one or more apertures of the one or more dampers using an actuator operably coupled to the damper unit.

19. The method of claim 17, further comprising:
sensing a pressure inside the vacuum plenum, the detected condition comprising the sensed pressure; and
wherein dynamically adjusting the impedance of the damper unit comprises adjusting the impedance of the damper unit to maintain the sensed pressure at or near a target pressure.

20. The method of claim 17,
determining an amount of the covered holes consisting of the holes of the movable support surface that are currently covered by the print media, the detected condition comprising the amount of the covered holes, and
wherein dynamically adjusting the impedance of the damper comprises adjusting the impedance of the damper unit in response to a change in the amount of the covered holes so as to maintain a target pressure in the vacuum plenum.

21. The method of claim 17, further comprising:
determining a number of the print media currently being transported by the movable support surface, the detected condition comprising the number of the print media;
wherein dynamically adjusting the impedance of the damper unit comprises adjusting the impedance of the damper in response to a change in the number of the print media.

22. The method of claim 17, further comprising:
determining image content, or a system setting associated with a current print job, the detected condition comprising one or more of the image content, or the system setting,
wherein dynamically adjusting the impedance of the damper unit comprises adjusting the impedance of the damper in response to a change in one or more of the image content, or the system setting.

* * * * *